United States Patent [19]

Yamada

[11] Patent Number: 4,928,779

[45] Date of Patent: May 29, 1990

[54] VEHICLE SPEED CONTROL DEVICE

[75] Inventor: Kazuhiko Yamada, Aichi, Japan

[73] Assignee: Kabushiki Kaisha Tokai Rika Denki Seisakusho, Aichi, Japan

[21] Appl. No.: 230,100

[22] Filed: Aug. 9, 1988

[30] Foreign Application Priority Data

Aug. 13, 1987 [JP] Japan .................. 62-124154[U]

[51] Int. Cl.$^5$ .............................................. B60K 31/02
[52] U.S. Cl. ...................................... 180/178; 180/179; 123/179 B; 364/426.04
[58] Field of Search ............... 180/170, 171, 172, 174, 180/175, 176, 178, 179, 173, 177, 279; 364/426.04, 569; 123/351, 399, 179 A, 179 B

[56] References Cited

U.S. PATENT DOCUMENTS

| | | | |
|---|---|---|---|
| 3,077,239 | 2/1963 | Simas | 180/174 |
| 3,157,244 | 11/1964 | McMurray et al. | 180/177 |
| 3,748,641 | 7/1973 | Hartung | 180/179 X |
| 4,120,373 | 10/1978 | Fleischer | 180/179 |
| 4,759,329 | 7/1988 | Nobuo et al. | 123/399 X |
| 4,769,765 | 9/1988 | Green | 364/569 X |

FOREIGN PATENT DOCUMENTS

| | | | |
|---|---|---|---|
| 0172718 | 10/1983 | Japan | 180/178 |
| 0036026 | 2/1986 | Japan | 180/179 |

Primary Examiner—Charles A. Marmor
Assistant Examiner—Brian L. Johnson
Attorney, Agent, or Firm—Finnegan, Henderson, Farabow, Garrett and Dunner

[57] ABSTRACT

A vehicle speed control device for providing constant speed traveling including a main switch circuit for enabling the constant speed traveling, a CPU coupled to the main switch circuit for providing a constant speed traveling control signal, and an actuator for activating a throttle value coupled thereto in response to the control signal output by the CPU. An electromagnetic relay coupled to the actuator inhibits the actuator in response to several signals including a signal from a timer circuit and the timer circuit provides its signal for a time after the start of the engine of the vehicle that is related to a sensed temperature in the engine.

9 Claims, 4 Drawing Sheets

VEHICLE SPEED CONTROL DEVICE

BACKGROUND OF THE INVENTION

This invention relates to a vehicle speed control device which maintains a desired constant traveling speed of a vehicle.

One example of a conventional vehicle speed control device for maintaining a constant speed of a vehicle is shown in FIG. 5.

As shown in FIG. 5, an ignition switch 31 has one terminal connected to a power supply, such as a battery (not shown) and another terminal to a main switch circuit 33 which is in turn connected to a speed control means, such as a CPU (central processing unit) 35. The main switch 33 includes a self-return type main switch 32 which is installed inside the vehicle near the operator of the vehicle and activated by the operator for constant speed traveling, and a relay switch 34 which is turned on or closed when the main switch 32 is turned on. Therefore, when the ignition switch 31 and the relay switch 34 are turned on, an operation power is supplied from the power supply to the CPU 35, so that the CPU 35 becomes energized for performing an operation for constant speed traveling.

The main switch circuit 33 further includes a normally closed-type release switch 36, and a relay coil 37 which turns on the relay switch 34 when the relay coil 37 is energized. A series circuit connecting the main switch 32, the release switch 36 and the relay coil 37 in series has one end connected to a connecting point S of the ignition switch 31 and the relay switch 34, and another end to a common ground. A connecting point T of the main switch 32 and the release switch 36 is electrically connected to a connecting point U of the relay switch 34 and the CPU 35, thus forming a self-hold circuit. Therefore, even when the main switch 32 is turned off or open, the relay switch 34 remains turned-on until the release switch 36 is activated.

A control switch 38 is adapted to set and reset a speed of constant speed traveling by the operator of the vehicle and generates an instruction signal representing the speed. The CPU 35 then generates in response to the instruction signal a drive control signal to an actuator 39. The actuator 39 then controls the extent of opening of a throttle valve 40 which in turn controls the amount of air sucked into an engine in response to the control signal. For example, if a "set" switch in the control switch 38 is activated when the traveling speed of the vehicle is 40 km/h, the CPU 35 stores that speed in memory and effectuates the actuator 39 to maintain that speed for the vehicle even if an acceleration pedal is not applied.

However, in the conventional vehicle speed control device, the constant speed traveling becomes effectuated even during the time immediately after the ignition switch 31 is turned on. Therefore, the conventional control device is disadvantageous because the output of the engine is not stable immediately after the start of the engine, the constant speed traveling is not properly carried out.

SUMMARY OF THE INVENTION

Accordingly, an object of this invention is to eliminate the above-described disadvantage of the conventional vehicle speed control device.

More specifically, an object of the invention is to provide a vehicle speed control device which inhibits constant speed traveling for a certain period of time immediately after a start of the engine during which time the constant speed traveling cannot be properly carried out.

The foregoing object and other objects of the invention are achieved by a vehicle speed control device including a main switch circuit having a main switch which is activated for constant speed traveling, speed control means which receives operational power from the main switch circuit and provides a control signal for the constant speed traveling, and an actuator coupled to the speed control means for driving, according to the control signal, a speed adjusting member which adjusts the vehicle travel speed.

The vehicle speed control device, according to the present invention, further includes interruption means for suspending the driving operation of the actuator which operation is carried out under the control of the speed control means, and a timer circuit for supplying a releasing signal after a predetermined time period commencing after the ignition switch is turned on, to release the interruption means from suspending the driving operation of the actuator.

In the vehicle speed control device of the present invention the timer circuit allows the interruption means to inhibit the operation of the actuator until the predetermined time period passes from the turning-on of the ignition switch, and the timer circuit supplies the releasing signal to suspend the inhibition by the interruption means so that the actuator operates according to the control signal provided by the speed control means.

The nature, principle and utility of the invention will become more apparent from the following detailed description when read in conjunction with the accompanying drawings.

DETAILED DESCRIPTION OF THE PREFERRED EMBODIMENTS

Figure 5:
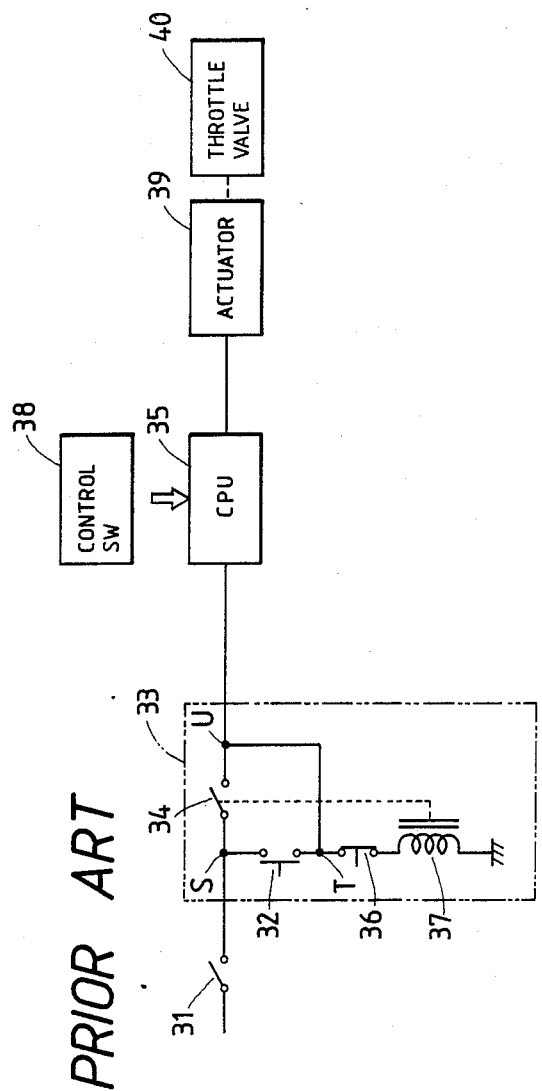
FIG. 5 is a circuit diagram of a conventional vehicle speed control device.

Preferred embodiments of this invention will be described with reference to the accompanying drawings. Wherever possible, the same reference numbers are used throughout the drawings to refer to the same or like parts. For example, those components which have been already described with reference to FIG. 5 are therefore designated by the same reference numerals.

Figure 1:
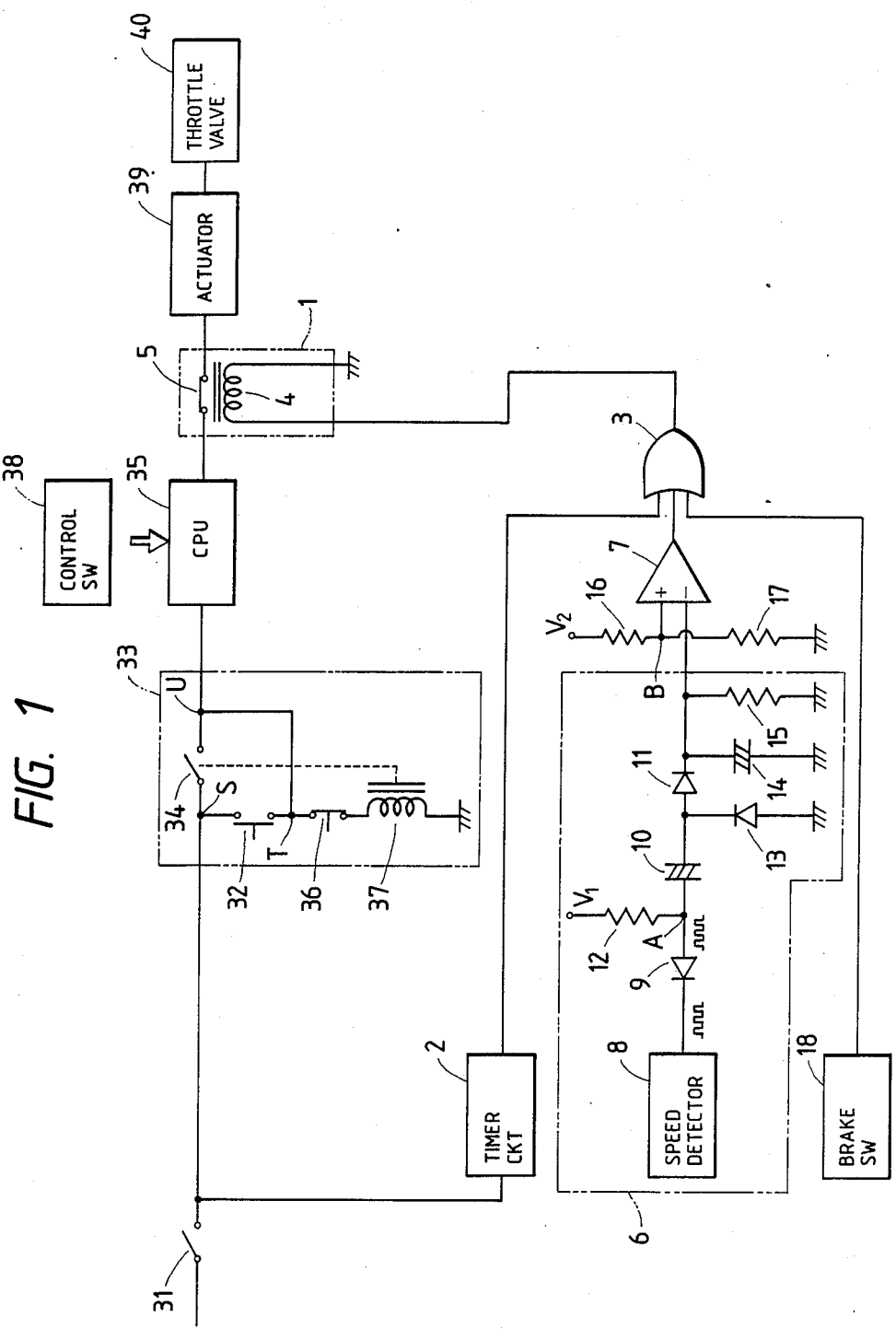
FIG. 1 is a circuit diagram of a vehicle speed control device according to a first embodiment of the present invention.

A vehicle speed control device according to a first embodiment of the present invention is shown in FIG. 1.

In FIG. 1, interruption means or an electromagnetic relay 1 is disposed intermediate CPU 35 and actuator 39 so that the operation of the actuator 39 is inhibited by energizing the relay 1.

A timer circuit 2 is disposed intermediate the ignition switch 31 and an OR circuit 3. The timer circuit 2 supplies a signal having an "H" level during a predetermined period of time, for instance five minutes, after the ignition switch 31 is turned on. During the predetermined period of time, the output of the timer circuit 2 is held at the "H" level and is supplied through the OR circuit 3 to the relay coil 4 of the electromagnetic relay 1 thereby to open or turn on the relay switch 5 of the relay 1. In other words, during the predetermined period of time (for instance, five minutes) after the ignition switch is turned on during which period the output of the engine is not stable, constant speed traveling can not be carried out.

After a predetermined period of time from the turning-on operation of the ignition switch 31, the timer circuit 2 outputs a signal (a releasing signal) having an "L" level, thereby deenergize and close or turn-on the relay coil 4. In other words, after the predetermined period of time has passed from the turn-on operation of the ignition switch 31, constant speed traveling can be carried out.

After the predetermined period of time from receipt of an input signal from the ignition switch 31, the timer circuit 2 supplies a signal which is opposite in logic value to the initially supplied signal. Provided that the timer circuit satisfies this condition, it may be an electromagnetic timer, or a counter type timer.

The speed control device of the first embodiment further includes a vehicle speed detection means or a vehicle speed detection circuit 6 and a brake switch 18.

The vehicle speed detection circuit 6, as shown in FIG. 1, is adapted to detect an actual vehicle traveling speed, and a signal representing the detected speed is input to a comparison means such as a comparator 7. In the comparator 7, the actual traveling speed is compared with a predetermined reference traveling speed (for example, 40 km/h in the embodiment). When the actual traveling speed becomes lower than the reference traveling speed, the comparator 7 outputs a signal having a "H" level to the OR circuit 3 then to the relay coil 4 of the electromagnetic relay 1 to open or turn-off the relay switch 5.

In the vehicle speed detection circuit 6, a vehicle speed detector 8 provides a pulse signal having a frequency proportional to a vehicle traveling speed to a cathode of a diode 9. An anode of the diode 9 is connected to a capacitor 10 at a connecting point A and then coupled to a diode 11 to a negative (−) input terminal of the comparator 7. The anode of the diode 9 is also connected to one end of a resistor 12 at the terminal A and then coupled to a constant voltage source $V_1$. A terminal of the capacitor 10 and the diode 11 is connected to a terminal of a diode 13; and another terminal of the diode 13 is connected to a ground. The negative (−) input terminal of the comparator 7 is connected to one end of a parallel circuit having a charge-discharge capacitor 14 and a resistor 15 connected in parallel. Another terminal of the parallel circuit is connected to ground.

When the vehicle speed detector 8 provides the pulse signal having a frequency proportional to a vehicle traveling speed to the diode 9, a voltage at the terminal A will have a pulse waveform having a frequency proportional to the vehicle traveling speed. The capacitor 14 is repeatedly charged and discharged by the voltage at the terminal A. The voltage of the capacitor 14 increases with the pulse frequency, which corresponds to the actual vehicle traveling speed. Then, the voltage corresponding to the actual traveling speed of the vehicle is output to the negative (−) input terminal of the comparator 7.

A reference voltage is applied to a positive (+) input terminal of the comparator 7. The voltage of a constant voltage source $V_2$ is divided by a voltage divider circuit having resistors 16 and 17, to provide the reference voltage at a terminal B of the resistors 16 and 17. The reference voltage is predetermined to be equal to a detection voltage which appears at the negative (−) input of the comparator 7 and corresponds to an actual vehicle traveling speed of 40 km/h. Therefore, at times when the vehicle traveling speed is lower than 40 km/h, the comparator 7 provides to the OR circuit 3 a signal having a positive potential or a "H" level. On the other hand, at times when the vehicle traveling speed is higher than 40 km/h, the comparator 7 outputs a signal having a zero potential or a "L" level.

At times when the vehicle traveling speed is lower than 40 km/h and thus the "H" level signal is sent to the OR circuit 3, which in turn is sent to the relay coil 4 of the electromagnetic relay 1, the relay coil 4 is energized by that signal, and the relay switch 5 is opened or turned off. On the other hand, at times when the vehicle traveling speed is higher than 40 km/h, the "L" level signal is sent to the OR circuit 3 and then to the relay coil 4 of the electromagnetic relay 1, the relay coil 4 is not energized, and the relay switch 5 remains closed or turned-on.

As shown in FIG. 1, a brake switch 18 detects whether a brake pedal is applied by an operator of the vehicle, and provides to the OR circuit 3 an "H" level signal at times when the pedal is applied. That signal is sent from the OR circuit 3 to the relay coil 4 of the electromagnetic relay 1, to open or turn off the relay switch 5.

In the speed control device of the present invention, even when the CPU 35 generates the drive control signal for constant speed traveling for the actuator 39 during the predetermined period of time after the ignition switch 31 is turned on, the actuator 39 will not respond to the generated drive control signal when the relay switch 5 of the electromagnetic relay 1 is open or turned off. Therefore, even if the driver attempts constant speed traveling by mistake, for example, during the predetermined period of time in which the constant speed traveling is not suitable because the engine output is unstable, the constant speed traveling will not be effected. Thus, with the vehicle speed control device of the present invention, a stable traveling control can be obtained.

Even if the ignition switch 31 and the main switch 32 are turned on and the CPU 35 generates the drive control signal for constant speed traveling for the actuator 39, the actuator 39 is not operated whenever the vehicle is running at a speed lower than 40 km/h, because the relay switch 5 of the electromagnetic relay 1 is open or turned off. Therefore, even if the operator of the vehicle attempts the constant speed traveling when the vehicle speed is not suitable for the constant speed travel control, for example, the vehicle speed being lower than 40 km/h, the constant speed traveling will not be carried out. Thus, the constant speed traveling can be carried out stably.

Similarly, if the operator applies the brake pedal while the constant speed traveling is in effect, the relay switch 5 of the electromagnetic relay 1 will be opened by the output signal of the brake switch 18. Therefore, the actuator 39 will not respond to the drive control signal outputted by the CPU 35, and thus the constant speed traveling will be suspended immediately. Thus, the constant speed traveling is held stable.

Figure 2:
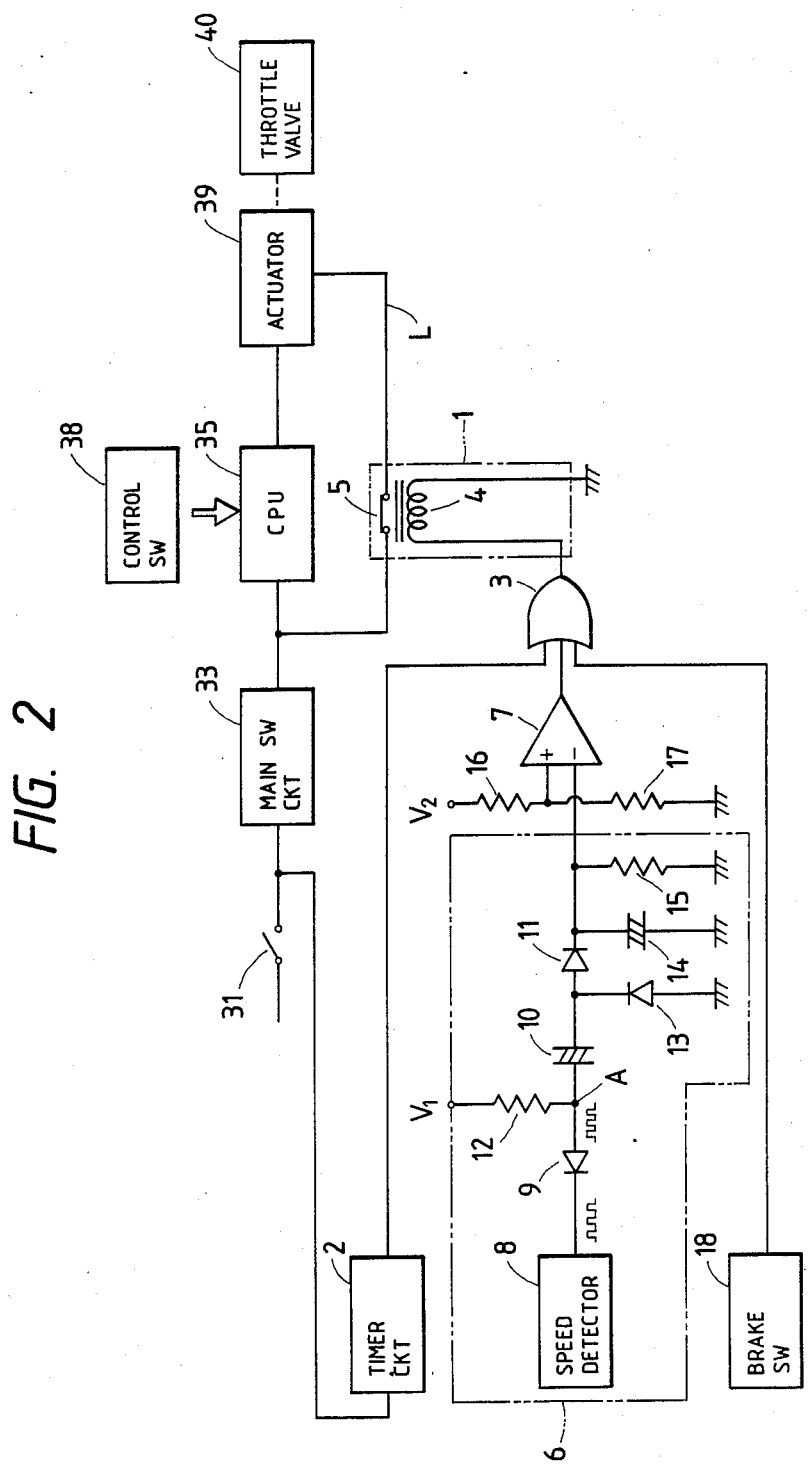
FIG. 2 is a circuit diagram of a vehicle speed control device according to a second embodiment of the presention invention.

FIG. 2 shows a second embodiment of the present invention.

According to the first embodiment described above and shown in FIG. 1, the electromagnetic relay 1 is provided on a line connecting the output of the CPU 35 to the input of the actuator 39. However, according to the second embodiment as shown in FIG. 2, the electromagnetic relay 1 is provided on a line L which connects the output of the main switch 33 and the input of the actuator 39 and supplies power from the ignition switch 31 to the actuator 39. In the second embodiment, even when the CPU 35 provides the drive control signal to the actuator 39, the operation of the actuator 39 is inhibited by cutting off the power from the ignition switch 31. Thus, the same effect as in the first embodiment can be achieved in the second embodiment shown in FIG. 2.

Figure 3:
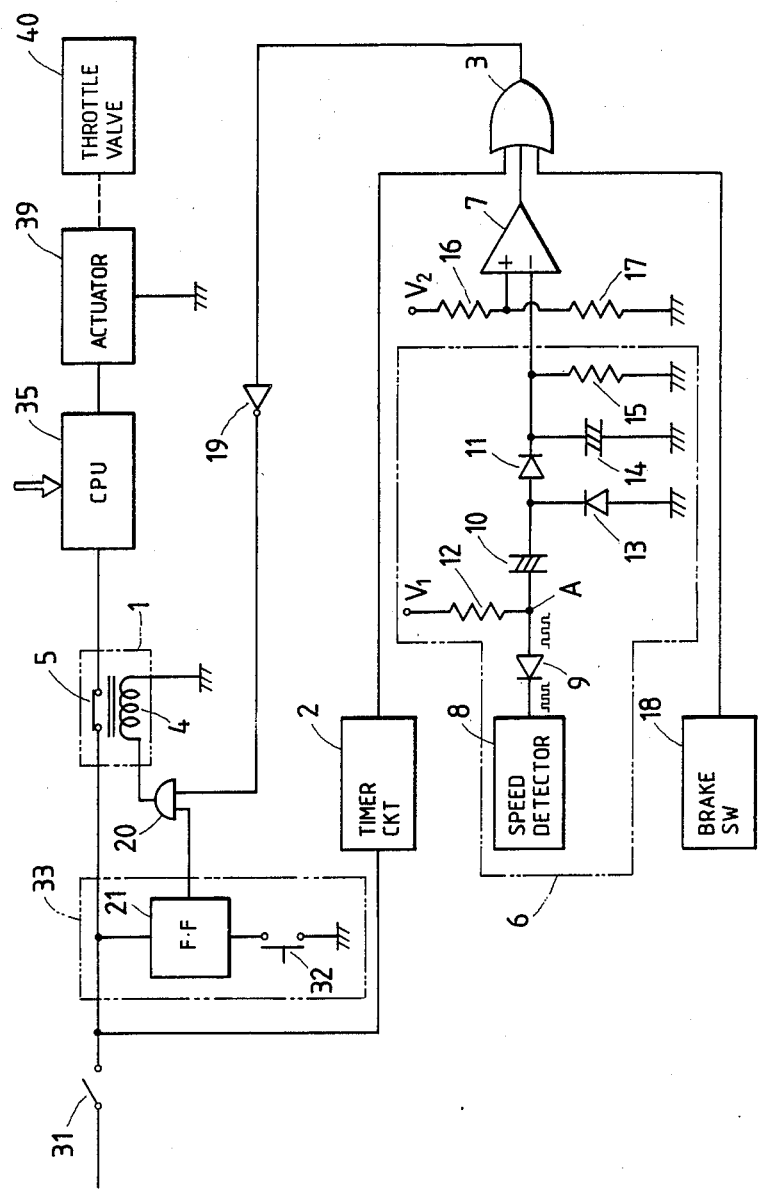
FIG. 3 is a circuit diagram of a vehicle speed control device accordingly to a third embodiment of the present invention.

FIG. 3 shows a third embodiment of the present invention

In FIG. 3, a main switch circuit 33 includes a flip-flop circuit 21 which provides an "H" level output and an "L" level output alternately when a main switch 32 is operated. The main switch circuit 33 is coupled to the CPU 35 through an electromagnetic relay 1 in which the relay switch 5 is closed when the relay coil 4 is energized, and it is opened when the relay coil 4 is not energized. The relay coil 4 of the electromagnetic relay 1 is coupled through an AND circuit 20 to the flip-flop circuit 21, and also through the AND circuit 20 and a NOT or inverter circuit 19 or the OR circuit 3.

If the flip-flop circuit 21 supplies the "H" level signal while the main switch 32 is activated, the timer circuit 2 outputs the "L" level signal after the predetermined period of time after the ignition switch 31 is turned on, thus raising the output of the NOT circuit 19 to the "H" level, which is in turn sent to the AND circuit 20. The relay coil 4 will be energized, thus permitting the constant speed traveling control.

On the other hand, if it is during the predermined period of time or the vehicle travels at a speed lower than 40 km/h, or the operator applies the brake pedal while the constant speed traveling is in effect, the signal which is sent from the NOT circuit 19 to the AND circuit 20 will have the "L" level, and therefore the relay coil 4 will not be energized and the power from the ignition switch 31 to the CPU 35 will be cut off and the constant speed traveling will not be carried out.

Since cutting off the power from the ignition switch 31 to the CPU 35 result in losing various data for constant speed traveling control stored in the CPU 35, a backup power source is provided to the CPU 35.

In the above-described embodiments, the brake switch 18 is used to detect whether the brake pedal is applied. However, instead of the brake switch, a switch for detecting whether a side brake is applied may be provided. Even without the brake switch 18, a constant traveling speed may be utilized for disengaging the actuator 39.

Figure 4:
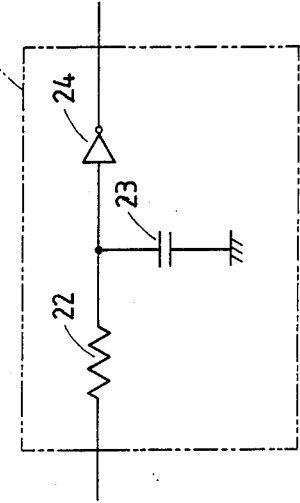
FIG. 4 is a circuit diagram of a timer circuit used in the vehicle speed control device of FIGS. 1-3.

Furthermore, a method may be employed in which the temperature of the engine cooling water is detected, and when the temperature is higher than a predetermined value which corresponds to a stable engine output, the timer circuit 2 accordingly decreases the predetermined period of time to be set, or the timer circuit ceases to operate at all. For example, as shown in FIG. 4, the timer circuit 2 may be made up of a thermistor 22 employed as a water temperature sensor which resistance decreases as the temperature increases, a charge capacitor 23, and a NOT circuit 24. When the water temperture is low, the time required for the output of the NOT circuit 24 to reach the "L" level from the "H" level will be long, and when the water temperature is high, the time required for the output of the NOT circuit 24 to reach the "L" level will be short.

Although, in the above-described embodiments, the reference travel speed is 40 km/h, it should be noted that the present invention is not limited thereto.

What is claimed is:

1. A vehicle speed control device for maintaining a substantially constant speed travelling of a vehicle, comprising:
   a main switch circuit for enabling and disabling the constant speed travelling;
   control signal means for providing a control signal for said constant speed travelling, provided the main switch circuit is enabled;
   an actuator responsive to the control signal means for initiating the constant speed travelling in response to the control signal and thereafter adjusting the travelling speed to be substantially constant;
   interruption means coupled to the actuator for inhibiting the constant speed travelling; and
   a timer circuit coupled to the interruption means for effecting the inhibiting for a predetermined time period after the operation of an ignition switch of the vehicle has commenced.

2. A vehicle speed control device as claimed in claim 1, further comprising speed detection means coupled to the interruption means for detecting the travelling speed of the vehicle, and effecting said inhibiting whenever the travelling speed is lower than a predetermined speed.

3. A vehicle speed control device as claimed in claim 1, further comprising a brake switch for effecting said inhibiting whenever the brake of the vehicle is applied during travelling of the vehicle.

4. A vehicle speed control device as claimed in claim 1, wherein said interruption means is adapted to interrupt the power and the control signal to the actuator.

5. A vehicle speed control device as claimed in claim 1, wherein said interruption means is adapted to interrupt the power to the actuator.

6. A vehicle speed control device as claimed in claim 1, wherein said interruption means is connected between said main switch circuit and said control means.

7. A vehicle speed control device as claimed in claim 1, wherein said main switch circuit enables and disables said constant speed travelling by providing and not providing, respectively, the power to said control signal means.

8. A vehicle speed control device as claimed in claim 1, wherein said interruption means includes an electromagnetic relay.

9. A vehicle speed control device as claimed in claim 1, wherein said predetermined time period is related to a temperature in the engine of the vehicle which is sensed from the engine cooling water of the vehicle.

* * * * *